United States Patent [19]

Mark

[11] Patent Number: 4,476,294

[45] Date of Patent: Oct. 9, 1984

[54] COPOLYESTER-CARBONATE RESINS

[75] Inventor: Victor Mark, Evansville, Ind.

[73] Assignee: General Electric Company, Mt. Vernon, Ind.

[21] Appl. No.: 562,274

[22] Filed: Dec. 16, 1983

[51] Int. Cl.³ ............................................. C08G 63/64
[52] U.S. Cl. .................................... 528/125; 528/126; 528/128; 528/173; 528/176; 528/191; 528/193; 528/194
[58] Field of Search ............... 528/125, 126, 128, 173, 528/176, 191, 193, 194

[56] References Cited

U.S. PATENT DOCUMENTS 4,107,143  8/1978  Inata et al. .......................... 528/193

4,381,358  4/1983  Rosenquist .......................... 528/193

*Primary Examiner*—Lester L. Lee
*Attorney, Agent, or Firm*—Martin B. Barancik; Myron B. Kapustij

[57] ABSTRACT

Thermoplastic aromatic copolyester-carbonate resins exhibiting improved processability derived from:
(i) at least one diester-diol which is the coreaction product of (a) at least one aromatic hydroxy carboxylic acid or an ester forming reactive derivative thereof, and (b) at least one diol selected from aliphatic diols, aliphatic ether diols, and aromatic diols;
(ii) at least one dihydric phenol; and
(iii) a carbonyl halide carbonate precursor.

36 Claims, No Drawings

COPOLYESTER-CARBONATE RESINS

BACKGROUND OF THE INVENTION

Copolyester-carbonate resins are members of the tough thermoplastic family of resins which, due to their many advantageous physical and mechanical properties, are finding increasing use as thermoplastic engineering materials. These copolyester-carbonate resins exhibit, for example, excellent properties of toughness, flexibility, impact strength, optical clarity, and high heat distortion temperatures. The conventional copolyester-carbonates may be produced by the coreaction of a dihydric phenol, a dicarboxylic acid or a reactive derivative thereof, and a carbonate precursor. These conventional copolyester-carbonates as well as methods for their preparation are disclosed inter alia in U.S. Pat. No. 3,169,121.

Unfortunately, however, these copolyester-carbonate resins are rather difficult to process. It would, therefore, be highly desirable to provide a copolyester-carbonate resin which is generally similar in many respects to conventional copolyester-carbonates and which also exhibits improved processability.

It is, therefore, an object of the instant invention to provide copolyester-carbonate resins exhibiting improved processability.

SUMMARY OF THE INVENTION

The instant invention is directed to copolyester-carbonate resins exhibiting improved processability which are derived from:

(i) at least one diester diol which is the coreaction product of (a) at least one aromatic hydroxy carboxylic acid or an ester forming reactive derivative thereof, and (b) a diol;

(ii) at least one dihydric phenol; and (iii) a carbonyl halide carbonate precursor.

While the instant copolyester-carbonate resins are generally similar, to a substantial degree, in substantially most physical and mechanical properties to conventional copolyester-carbonate resins they also exhibit improved processability as characterized by improved flow rates. The copolyester-carbonate resins of the instant invention are useful in substantially most of the applications in which conventional copolyester-carbonates are generally employed. In particular, the instant copolyester-carbonate resins are useful for making tough transparent films and molded articles.

DESCRIPTION OF THE INVENTION

The instant invention is directed to copolyester-carbonate resins generally exhibiting, to a substantial degree, generally most of the physical and mechanical properties of conventional copolyester-carbonate resins and also exhibiting improved processability.

Briefly stated, the copolyester-carbonates of this invention are comprised of recurring carbonate groups $$(-O-\overset{O}{\underset{\|}{C}}-O-)$$

carboxylate groups $$(-\overset{O}{\underset{\|}{C}}-O-)$$

and aromatic carbocyclic groups in the polymer chain in which at least some of the carboxylate groups and at least some of the carbonate groups are bonded directly to ring carbon atoms of the aromatic carbocyclic groups.

The copolyester-carbonates of the instant invention contain recurring structural units represented by the general formulae $$(-O-R-\overset{O}{\underset{\|}{C}}-O-R^1-O-\overset{O}{\underset{\|}{C}}-R-O-\overset{O}{\underset{\|}{C}}-), \text{ and} \quad \text{I.}$$

$$(-O-R^2-\overset{O}{\underset{\|}{O}}-\overset{}{C}-) \quad \text{II.}$$

wherein:

R is independently selected from divalent aromatic radicals;

$R^1$ is selected from divalent aliphatic hydrocarbon radicals, divalent aromatic radicals, and divalent aliphatic ether residues; and $R^2$ is selected from the divalent residues of dihydric phenols.

R in Formula I is a divalent aromatic radical, preferably one represented by the general formula

[benzene ring with $(R^4)_s$ substituents]

wherein: p0 $R^4$ is independently selected from monovalent hydrocarbon radicals and halogen radicals; and s is a positive integer having a value of from 0 to 4 inclusive.

The monovalent hydrocarbon radicals represented by $R^4$ are preferably selected from alkyl radicals and cycloalkyl radicals. The preferred alkyl radicals are those containing from 1 to about 10 carbon atoms. These alkyl radicals include the straight chain alkyl radicals and the branched alkyl radicals. Some illustrative non-limiting examples of these alkyl radicals include methyl, ethyl, propyl, isopropyl, butyl, tertiarybutyl, pentyl, neopentyl, and hexyl. The preferred cycloalkyl radicals are those containing from 4 to about 7 ring carbon atoms. Some illustrative non-limiting examples of these cycloalkyl radicals include cyclobutyl, cyclopentyl, methylcyclohexyl, and cyclohexyl.

The preferred halogen radicals represented by $R^4$ are chlorine and bromine.

When more than one $R^4$ substituent is present they may be the same or different.

$R^1$ in Formula I is selected from divalent aliphatic hydrocarbon radicals, divalent aliphatic ether residues, and divalent aromatic radicals.

The preferred divalent aliphatic hydrocarbon radicals represented by $R^1$ are the alkylene and cycloalkylene radicals. The preferred alkylene radicals are those containing from 1 to about 20 carbon atoms. The alkylene radicals may be straight chain alkylene radicals or branched alkylene radicals. The preferred cycloalkylene radicals are those containing from 4 to about 7 ring carbon atoms.

The divalent aliphatic ether residues represented by $R^1$ have the general formula $$(-R^5-O)_n R^6-$$

wherein:

$R^5$ is selected from alkylene and cycloalkylene radicals;
$R^6$ is selected from alkylene and cycloalkylene radicals; and
n is a positive integer having a value of from 1 to about 10.

Preferred alkylene radicals represented by $R^5$ and $R^6$ are those containing from 1 to about 20 carbon atoms. They may be branched or straight chain alkylene radicals. Preferred cycloalkylene radicals represented by $R^5$ and $R^6$ are those containing from 4 to about 7 ring carbon atoms.

Some illustrative non-limiting examples of the divalent aliphatic hydrocarbon radicals and the divalent aliphatic ether residues represented by $R^1$ include:

—$CH_2$—$CH_2$—;
—$CH_2$—$(CH_2)_8$—$CH_2$—;
—$CH_2$—$CH_2$—O—$CH_2$—$CH_2$;

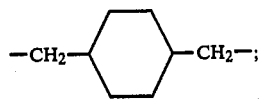

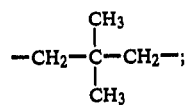

—$CH_2$—$(CH_2)_2$—$CH_2$—; and

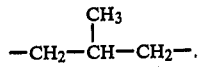

The divalent aromatic radicals represented by $R^1$ may be represented by the general formula

wherein $R^7$ is independently selected from monovalent hydrocarbon radicals and halogen radicals; Ar is a divalent aromatic radical; and q is a positive integer from and including zero up to the number of positions on Ar available for substitution. The monovalent hydrocarbon radicals include alkyl radicals, preferably those containing from 1 to about 10 carbon atoms, cycloalkyl radicals, preferably those containing from 4 to about 7 ring carbon atoms, aryl radicals, preferably those containing from 6 to 12 carbon atoms, and aralkyl and alkaryl radicals, preferably those containing from 7 to about 14 carbon atoms. The preferred halogen radicals are chlorine and bromine. Ar preferably contains from 6 to 12 carbon atoms and includes phenylene, biphenylene, and naphthylene.

Ar also includes two phenylene radicals joined by an intervening alkylene or other bridging group. That is to say, $R^1$ may also be a divalent aromatic radical represented by the general formula

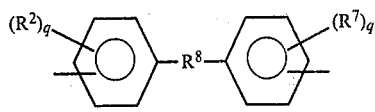

wherein $R^7$ and q are as defined hereinafore, and $R^8$ is selected from alkylene, alkylidene, cycloalkylene, cycloalkylidene, —O—, —S—, —S—S—,

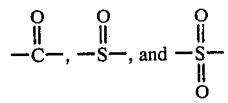

radicals. Preferred alkylene radicals are those containing from 2 to about 10 carbon atoms. Preferred alkylidene radicals are those containing from 1 to about 10 carbon atoms. Preferred cycloalkylene and cycloalkylidene radicals are those containing from 4 to about 7 ring carbon atoms.

$R^2$ in Formula II is selected from the residues of dihydric phenols. The preferred residues are represented by the general formula

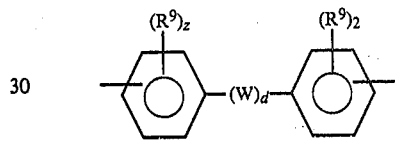

wherein:

W is selected from divalent hydrocarbon radicals, —O—, —S—, —S—S—,

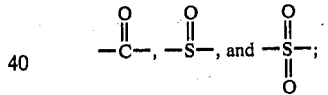

$R^9$ is independently selected from monovalent hydrocarbon radicals and halogen radicals;

z is independently selected from positive integers having a value of from 0 to 4 inclusive; and d is either zero or one.

The divalent hydrocarbon radicals represented by W are preferably selected from alkylene radicals, cycloalkylene radicals, alkylidene radicals, and cycloalkylidene radicals. Preferred alkylene radicals are those containing from 2 to about 10 carbon atoms. Preferred alkylidene radicals are those containing from 1 to about 10 carbon atoms. Preferred cycloalkylene and cycloalkylidene radicals are those containing from 4 to about 7 ring carbon atoms.

The monovalent hydrocarbon radicals represented by $R^9$ are selected from alkyl radicals, cycloalkyl radicals, aryl radicals, aralkyl radicals, and alkaryl radicals. The preferred alkyl radicals are those containing from 1 to about 10 carbon atoms. Some illustrative non-limiting examples of these preferred alkyl radicals include methyl, ethyl, propyl, isopropyl, butyl, tertiarybutyl, pentyl, and neopentyl.

The preferred cycloalkyl radicals are those containing from 4 to about 7 ring carbon atoms. Some illustrative non-limiting examples of these preferred cycloalkyl radicals include cyclobutyl, cyclopentyl, cyclohexyl, methylcyclohexyl, and cycloheptyl.

The preferred aryl radicals are those containing from 6 to 12 ring carbon atoms. These include phenyl, biphenyl and naphthyl.

The preferred aralkyl and alkaryl radicals are those containing from 7 to about 14 carbons.

When more than one $R^9$ substituent is present they may be the same or different. When d is zero the aromatic nuclear residues are directly joined without any intervening alkylene or other bridging group.

The preferred divalent residues of dihydric phenols are those wherein d is one and W represents an alkylene, alkylidene, cycloalkylene or cycloalkylidene radical. A particularly useful residue of a dihydric phenol is the residue of bisphenol-A.

The copolyester-carbonate resins of the instant invention are prepared by reacting:

(i) at least one diester-diol which is the coreaction product of (a) at least one aromatic hydroxycarboxylic acid or its ester forming reactive derivative, and (b) at least one diol selected from aliphatic diols, aromatic diols, and aliphatic ether diols;

(ii) at least one dihydric phenol; and (iii) a carbonyl halide carbonate precursor.

The aromatic hydroxy carboxylic acid reactants may be represented by the general formula

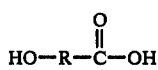    III.

wherein R is as defined hereinafore. Some illustrative non-limiting examples of aromatic hydroxy carboxylic acids of Formula III include p-hydroxybenzoic acid, m-hydroxybenzoic acid, 3-hydroxy-5-chlorobenzoic acid, 3-chloro-4-hydroxybenzoic acid, 3-hydroxy-5-methylbenzoic acid, and 3-ethyl-4-hydroxybenzoic acid.

It is possible, and sometimes even preferred, to utilize the ester forming reactive derivatives of these aromatic hydroxy benzoic acids rather than using the acids themselves. These ester forming reactive derivatives of the aromatic hydroxy benzoic acids of Formula III may be represented by the general formula

    IIIa wherein R is as defined hereinafore and X includes halogen radicals, preferably chlorine and bromine, and the $-OR^{12}$ radicals wherein $R^{12}$ represents a monovalent hydrocarbon radical. The monovalent hydrocarbon radicals represented by $R^{12}$ are selected from alkyl radicals, cycloalkyl radicals, aryl radicals, aralkyl radicals and alkaryl radicals.

The preferred alkyl radicals represented by $R^{12}$ are those containing from 1 to about 10 carbon atoms. The preferred cycloalkyl radicals represented by $R^{12}$ are those containing from 4 to about 7 ring carbon atoms. The preferred aryl radicals are those containing from 6 to 12 ring carbon atoms. The preferred aralkyl and alkaryl radicals represented by $R^{12}$ are those containing from 7 to about 14 carbon atoms.

It is, of course, possible to utilize mixtures of two or more different aromatic hydroxy carboxylic acids or their ester forming reactive derivatives as well as individual acids or their reactive derivatives. Therefore, whenever the term aromatic hydroxy carboxylic acid or its reactive derivative is used herein it is to be understood that this term includes mixtures of two or more different aromatic hydroxy carboxylic acids or their ester forming reactive derivatives as well as the individual acids or their ester forming reactive derivatives.

The aromatic, aliphatic, or alphatic ether diol reactants may be represented by the general formula

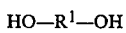    IV. PS wherein $R^1$ is as defined hereinafore.

The aliphatic diols may be represented by the formula HO—Al—OH wherein Al is an alkylene or cycloalkylene radical of the type described hereinafore.

The aliphatic ether diols of Formula IV may be represented by the general formula $$HO-(-R^5-O-)_nR^6-OH \quad \text{IVa.}$$

wherein $R^5$, $R^6$, and n are as defined hereinafore.

The aromatic diols of Formula IV may be represented by the general formula

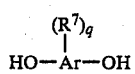    IVb wherein $R^7$, q and Ar are as defined hereinafore.

It is possible to utilize a mixture of two or more different diols of Formula IV as well as individual diols of Formula IV. For example, it is possible to utilize two or more different diols of Formula IVa, two or more different diols of Formula IVb, or one diol of Formula IVa and one diol of Formula IVb.

In preparing the copolyester-carbonates of this invention the aromatic hydroxy carboxylic acid or its ester forming reactive derivative is reacted with the diol of Formula IV to form a diester diol intermediate. More particularly, 2 moles of the aromatic aromatic hydroxy carboxylic acid or its ester forming reactive derivative are reacted with one mole of the diol of Formula IV to form a diester diol of the formula

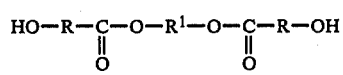    V.

wherein R and $R^1$ are as defined hereinafore. More particularly, the diester diols of Formula V may be represented by the general formula

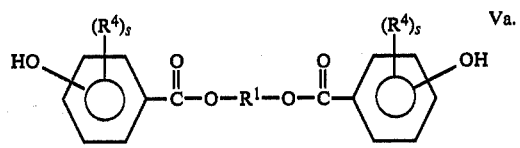    Va.

wherein $R^1$, $R^4$ and s are as defined hereinafore.

The reaction of the aromatic hydroxy carboxylic acid or its ester forming reactive derivative with the diol is carried out under substantially anhydrous conditions. If the aromatic hydroxy carboxylic acid itself or its ester derivative, i.e., where X is $-OR^{12}$, is utilized the reaction is carried out in the presence of an esterification-transesterification catalyst. Such catalysts are well known in the art and include the protic acids and the Lewis acids. Some useful Lewis acid catalysts are disclosed in U.S. Pat. No. 4,045,464, which is hereby incorporated by reference. If the acid halide is used, i.e., where X is a halogen radical, the reaction of the acid halide with the diol is preferably carried out in the presence of an acid acceptor. These acid acceptors are well known in the art and include the organic basis such as pyridine, triethylamine, and the like, and the inorganic basis such as sodium hydroxide, calcium hydroxide, and the like.

In order to avoid or keep to a minimum the formation of byproducts other than the diester-diol product during the reaction of the acid or its ester forming reactive derivative with the diol the reaction conditions and/or the reactants may be selected so that the diester-diol is the predominant product. Thus, for example, if an aromatic diol such as bisphenol-A is utilized it may be reacted with a phenyl ester of the aromatic hydroxy carboxylic acid in the presence of a transesterification catalyst and the phenol byproduct may be removed by distillation. If an aliphatic diol is utilized the reaction of the acid with itself to form the ester of the aromatic hydroxy carboxylic acid is negligible as the predominant reaction product is that of the acid with the aliphatic diol, i.e., the diester-diol.

While theoretically 2 moles of the acid or its ester forming reactive derivative will react with one mole of the diol to form one mole of the diester-diol, it is sometimes preferred to utilize an excess of the acid.

Some illustrative non-limiting examples of the aliphatic diols and aliphatic ether diols which are reacted with the aromatic hydroxy carboxylic acid or its ester forming reactive derivative to produce the diester-diol include:

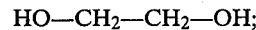
HO—CH$_2$—CH$_2$—OH;

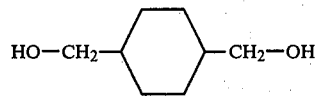

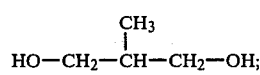

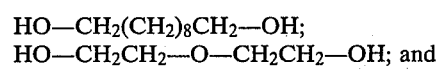
HO—CH$_2$(CH$_2$)$_8$CH$_2$—OH;
HO—CH$_2$CH$_2$—O—CH$_2$CH$_2$—OH; and

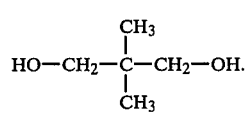

Some illustrative non-limiting examples of the aromatic diols include:

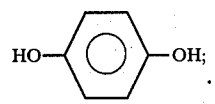

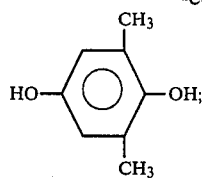

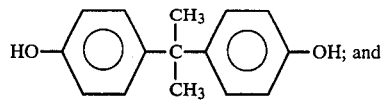

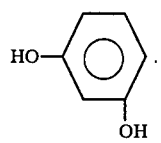

The carbonate precursor reactant is selected from carbonyl halides. The carbonyl halides include carbonyl bromide, carbonyl chloride, and mixtures thereof. The preferred carbonyl halide is carbonyl chloride, also known as phosgene.

The dihydric phenol reactant may be represented by the general formula

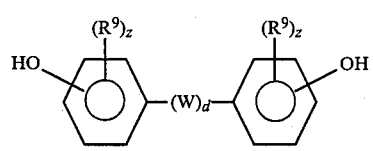

wherein $R^9$, z, W and d are as defined hereinafore.

Some illustrative non-limiting examples of the dihydric phenols of Formula VI include:
2,2-bis(4-hydroxphenyl)propane (bisphenol-A);
2,2-bis(3,5-dimethyl-4-hydroxyphenyl)propane;
2,2-bis(3-chloro-4-hydroxyphenyl)propane;
bis(4-hydroxyphenyl)methane;
1,1-bis(4-hydroxyphenyl)cyclohexane;
1,1-bis(4-hydroxyphenyl)ethane;
4,4'-thiodiphenol;
1,3-bis(4-hydroxyphenyl)propane;
3,3-bis(4-hydroxyphenyl)pentane;
2,2-bis(3-chloro-5-methyl-4-hydroxyphenyl)propane; and
2,2-bis(3,5-dibromo-4-hydroxyphenyl)propane.

In order to produce the copolyester-carbonates of the instant invention the diester-diol of Formula V, the dihydric phenol of Formula VI, and the carbonyl halide carbonate precursor are reacted under reaction conditions effective to form copolyester-carbonates containing the recurring or repeating structural units of Formulae I and II. In the reaction an amount of carbonyl halide carbonate precursor which is at least equal to the amounts of diester-diol and dihydric phenol is employed. Generally, an excess of carbonyl halide carbonate precursor is employed.

The relative amounts of the structural units of Formulae I and II present in the copolyester-carbonates will depend upon the relative amounts of the diester-diol and the dihydric phenol employed. Thus, for example, the larger the amount of diester-diol employed, the greater the amount of recurring structural units of Formula I present in the copolyester-carbonate. The larger the amount of dihydric phenol employed, the greater the amount of recurring units of Formula II present in the copolyester-carbonate.

The amount of the diester-diol employed is an amount effective to improve the processability of the copolyester-carbonate resin but insufficient to significantly deleteriously affect the other advantageous properties of the copolyester-carbonate resin. Generally this amount is in the range of from about 1 to about 45 mole percent, based on the amount of dihydric phenol used, and preferably from about 2 to about 25 mole percent, based on the amount of the dihydric phenol present.

One method of preparing the copolyester-carbonate resins of the instant invention from the diester-diol, the dihydric phenol, and the carbonyl halide carbonate precursor involves the heterogeneous interfacial polymerization technique. In this method two immiscible solvent systems are utilized for the reactants, one being an aqueous solvent system and the other being a water immiscible organic solvent system such as methylene chloride. The dihydric phenol is dissolved in the aqueous system, such as an alkaline aqueous system, while the diester-diol is dissolved in the organic solvent system. The addition of the carbonyl halide, which is preferably phosgene, is carried out under basic conditions by utilizing an aqueous caustic solution to maintain the pH in the basic range. Also present in the reaction mixture are a catalyst and a molecular weight regulator.

The catalysts which may be employed are any of the well known catalysts that accelerate or promote the copolyester-carbonate forming reaction. Suitable catalysts include, but are not limited to, tertiary amines such as triethylamine, quaternary ammonium compounds, and quaternary phosphonium compounds.

The molecular weight regulators employed may be any of the well known compounds that regulate the molecular weight of the copolyester-carbonate by a chain terminating mechanism. These compounds include, but are not limited to, phenol, tertiarybutyl phenol, and Chroman-I.

The temperature at which the phosgenation reaction proceeds may vary from below 0° C. to above 100° C. The reaction proceeds satisfactorily at temperatures from room temperature (25° C.) to about 50° C.

The instant copolyester-carbonates generally have a weight average molecular weight in the range of from about 10,000 to about 150,000, and preferably from about 15,000 to about 100,000.

The copolyester-carbonates of the instant invention may optionally have admixed therewith certain commonly known and used additives such as inert fillers such as glass, talc, mica and clay; impact modifiers; ultraviolet radiation absorbers such as the benzophenones and the benzotriazoles; hydrolytic stabilizers such as the epoxides disclosed in U.S. Pat. Nos. 3,489,716, 4,138,379 and 3,839,247, all of which are hereby incorporated herein by reference; color stabilizers such as the organophosphites; and flame retardants.

Some particularly useful flame retardants are the alkali and alkaline earth metal salts of sulfonic acids. These types of flame retardants are disclosed in U.S. Pat. Nos. 3,933,734, 3,948,851, 3,926,908, 3,919,167, 3,909,490, 3,953,396, 3,931,100, 3,978,024, 3,953,399, 3,917,559, 3,951,910 and 3,940,366, all of which are incorporated herein by reference.

DESCRIPTION OF THE PREFERRED EMBODIMENT

In order to more fully and clearly illustrate the present invention the following examples are set forth. It is intended that the examples be considered as illustrative rather than limiting the invention as disclosed and claimed herein. In the examples all parts and percents are on a weight basis, unless otherwise indicated.

The following examples illustrate the preparation of the diester-diols of the instant invention.

EXAMPLE 1

This example illustrates the preparation of 1,10-decamethylene-bis(4-hydroxybenzoate).

A well stirred mixture of 76.1 grams (0.5 mole) of methyl p-hydroxybenzoate, 43.6 grams (0.25 mole) of 1,10-decanediol, and 0.3 gram of dibutyltin oxide is heated at 190°–200° C. for a period of about 5 hours in a reaction flask that is equipped with a distillation head and a reflux condenser permitting the methyl alcohol gradually liberated in the ester exchange reaction to be distilled at atmospheric pressure. When reflux of the alcohol ceases, water aspirator vacuum is applied and traces of the alcohol are stripped off, leaving behind as residue the diester-diol, which weighs 102.6 grams and represents a 99% yield. Recrystallization is effected by methanol/water, which yields white crystals with a melting point of 154°–155° C.

EXAMPLE 2

This example illustrates the preparation of 1,4-tetramethylene-bis(4-hydroxybenzoate).

A well stirred mixture of 76.1 grams (0.5 mole) of methyl p-hydroxybenzoate, 22.5 grams (0.25 mole) of 1,4-butanediol, and 0.51 gram of tetraoctyl titanate is heated at 170° C. for a period of about 8 hours in a reaction flask that is equipped with a distillation head and a reflux condenser permitting methanol, which is liberated during the ester exchange reaction, to be distilled at atmospheric pressure. When reflux of the alcohol ceases, water aspirator vacuum is applied and the remaining traces of the alcohol are stripped off. Recrystallization is effected by methanol/water, which yields crystals having a melting point of 182.5°–184° C.

EXAMPLE 3

The procedure of Example 1 is substantially repeated except that the 1,10-decanediol is replaced with 0.25 mole of 2,2-dimethyl-1,3-propanediol. The resultant crystals of the diester-diol have a melting point of 156°–159° C.

EXAMPLE 4

The procedure of Example 1 is substantially repeated except that the 1,10-decanediol is replaced with 0.25 mole of 2-hydroxyethyl ether. The resultant crystals of the diester-diol have a melting point of 119°–121° C.

EXAMPLE 5

The procedure of Example 1 is substantially repeated except that the 1,10-decanediol is replaced with 0.25 mole of a cis/trans mixture of 1,4-cyclohexanedimethanol.

The following example illustrates the preparation of a conventional copolyester-carbonate resin falling outside the scope of the instant invention. This example is presented for comparative purposes only.

EXAMPLE 6

To a reactor vessel fitted with a mechanical agitator are charged 10 liters of deionized water, 16 liters of methylene chloride, 1,910 grams (8.36 moles) of bisphenol-A, 24 milliliters of triethylamine, 3.4 grams of sodium gluconate, and 65 grams of para-tertiarybutyl phenol. This reaction mixture is stirred and to the stirred mixture are added over a 15 minute period 926 grams of terephthaloyl dichloride and 163 grams of isophthaloyl dichloride as a 25 weight percent solids solution in methylene chloride. During the acid chloride addition the pH is maintained in the range of 8.5-11.5 by the addition of 25% aqueous sodium hydroxide solution. The resulting mixture is phosgenated by the introduction of phosgene at the rate of 36 grams per minute for 15 minutes with the pH controlled at 9.5 to 12 by the addition of the aqueous sodium hydroxide. After phosgenation is terminated, 6 liters of methylene chloride are added, the brine layer is separated by centrifuge and the resin is washed with dilute aqueous HCl and three times with water. The resin is steam precipitated and dried in a nitrogen fluid bed drier at approximately 240° C.

The Kasha Index (KI) of this resin is determined and the results are set froth in Table I.

The Kasha Index (KI) is an indication or measure of the processability of the resin. The lower the KI the greater the melt flow rate and, therefore, the better the processability of the resin. Basically, the Kasha Index is a measurement of the melt viscosity of the resin. The procedure for determining the Kasha Index is as follows: 7 grams of resin pellets, dried a minimum of 90 minutes at 125° C. are added to a modified Tinius-Olsen T3 melt indexer; the temperature in the indexer is maintained at 300° C. and the resin is heated at this temperature for 6 minutes; after 6 minutes the resin is forced through a 0.04125 inch radius orifice using a plunger of radius 0.1865 inch and an applied force of 17.7 pounds; the time required for the plunger to travel 2 inches is measured in centiseconds and this is reported as the KI. The higher the KI the higher the melt viscosity of the resin and the more viscous the resin and, therefore, the more difficult to process.

The following example illustrates the preparation of a conventional polycarbonate resin falling outside the scope of the instant invention. This example is presented for comparative purposes only.

EXAMPLE 7

Into a mixture of 57.1 grams (0.25 mole) of bisphenol-A, 300 milliliters of water, 400 milliliters of methylene chloride, 0.6 gram of phenol, and 0.56 gram of triethylamine are introduced, at ambient temperature, 31.0 grams of phosgene over a period of 31 minutes while maintaining the pH of the two phase system at about 11 by the simultaneous addition of a 25% aqueous solution of sodium hydroxide. At the end of the phsogene addition period the pH of the aqueous phase is 11.7 and the bisphenol-A content of this phase is less than 1 part per million as demonstrated by ultraviolet analysis.

The methylene chloride phase is separated from the aqueous phase, washed with an excess of dilute (0.01N) aqueous HCl and then washed three times with deionized water. The polymer is precipitated with methanol and dried at 80° C. The resultant polymer has an I.V. in methylene chloride at 25° C. of 0.622 and a glass transition temperature (Tg) of 149° C.

The KI of this polycarbonate is determined and the results are set forth in Table I.

The following examples illustrate the preparation of the copolyester-carbonates of the instant invention.

EXAMPLE 8

Into a mixture of 57.1 grams (0.25 mole) of bisphenol-A, 10.4 grams (0.025 mole) of 1,10-decamethylene-bis(4-hydroxybenzoate), 300 milliliters of water, 400 milliliters of methylene chloride, 0.6 gram of phenol, and 0.56 grams of triethylamine are introduced, at ambient temperature, 31.0 grams of phosgene over a period of 31 minutes while maintaining the pH of the two phase system at about 11 by the simultaneous addition of a 25% aqueous sodium hydroxide solution. At the end of the phosgene addition period the pH of the aqueous phase is 11.7.

The methylene chloride phase is separated from the aqueous phase, washed with an excess of dilute (0.01N) aqueous HCl and then washed three times with deionized water. The polymer is precipitated with methanol and dried at 80° C. The resultant polymer has an I.V. of 0.636 dl/gm in methylene chloride at 25° C. and a Tg of 131° C.

The KI of this polymer is determined and the results are set forth in Table I.

EXAMPLE 9

The procedure of Example 8 is substantially repeated except that th 10.4 grams of the 1,10-decamethylene-bis(4-hydroxybenzoate) are replaced with 8.3 grams (0.025 mole) of 1,4-tetramethylene-bis (4-hydroxybenzoate).

The resultant polymer has an I.V. in methylene chloride at 25° C. of 0.618 dl/gm and a Tg of 145° C.

The KI of this polymer is determined and the results are set forth in Table I.

EXAMPLE 10

The procedure of Example 8 is substantially repeated except that the 10.4 grams of 1,10-decamethylene-bis(4-hydroxybenzoate) are replaced with 8.6 grams (0.025 mole) of the diester-diol prepared in accordance with the procedure of Example 3.

The resultant polymer has an I.V. in methylene chloride at 25° C. of 0.439 dl/gm and a Tg of 143° C.

The KI of this polymer is determined and the results are set forth in Table I.

EXAMPLE 11

The procedure of Example 8 is substantially repeated except that the 10.4 grams of 1,10-decamethylene-bis(4-hydroxybenzoate) are replaced with 8.7 grams (0.025 mole) of the diester-diol prepared in accordance with the procedure of Example 4.

The resultant polymer has an I.V. in methylene chloride at 25° C. of 0.463 dl/gm and a Tg of 138° C.

The KI of this polymer is determined and the results are set forth in Table I.

EXAMPLE 12

The procedure of Example 8 is substantially repeated except that the 10.4 grams of 1,10-decamethylene-bis(4-hydroxybenzoate) are replaced with 9.7 grams (0.025 mole) of the diester-diol prepared in accordance with the procedure of Example 5.

The resultant polymer has an I.V. in methylene chloride at 25° C. of 0.595 dl/gm and a Tg of 149° C.

The KI of this polymer is determined and the results are set forth in Table I.

TABLE I

| Example No. | KI |
|---|---|
| 6 | 42,630 |
| 7 | 9,240 |
| 8 | 7,010 |
| 9 | 8,180 |
| 10 | 2,090 |
| 11 | 1,970 |
| 12 | 6,215 |

As illustrated by the data in Table I the copolyester-carbonates of the instant invention exhibit a lower KI than the conventional copolyester-carbonates (Example 6). Furthermore, not only do the instant copolyester-carbonates exhibit a lower KI than conventional copolyester-carbonates, but they also exhibit a lower KI than conventional polycarbonates (Example 7). Thus, not only do the instant copolyester-carbonates exhibit improved processability as compared with conventional copolyester-carbonate resins, but they also exhibit better processability than conventional polycarbonates. Since generally polycarbonates exhibit better processability than copolyester-carbonate resins, this improved processability vis-a-vis conventional polycarbonates is unusual and unexpected.

Obviously, other modifications and variations of the present invention are possible in light of the above teachings. It is, therefore, to be understood that changes may be made in the particular embodiments of the invention described which are within the full intended scope of the invention as defined by the appended claims.

What is claimed is:

1. Thermoplastic aromatic copolyester-carbonate resin exhibiting improved processability containing recurring structural units represented by the general formulae:

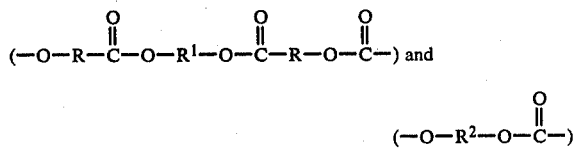 and

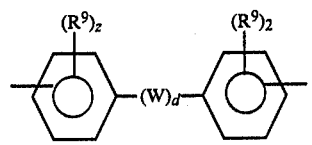

wherein:
R is independently selected from divalent aromatic radicals;
R$^1$ is selected from divalent aliphatic hydrocarbon radicals, divalent aliphatic ether residues, and divalent aromatic radicals; and
R$^2$ is selected from divalent residues of dihydric phenols represented by the general formula

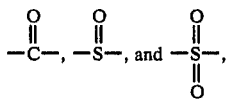

wherein
W is selected from divalent hydrocarbon radicals, —O—, —S—, —S—S—,

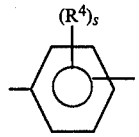

R$^9$ is independently selected from monovalent hydrocarbon radicals and halogen radicals,
z is independently selected from positive integers having a value of from 0 to 4 inclusive, and
d is either zero or one.

2. The resin of claim 1 wherein said divalent aromatic radicals represented by R are selected from radicals represented by the general formula

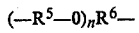

wherein:
R$^4$ is independently selected from monovalent hydrocarbon radicals and halogen radicals; and
s is a positive integer having a value of from 0 to 4 inclusive.

3. The resin of claim 2 wherein said monovalent hydrocarbon radicals represented by R$^4$ are selected from alkyl radicals and cycloalkyl radicals.

4. The resin of claim 2 wherein said halogen radicals are selected from chlorine and bromine.

5. The resin of claim 2 wherein said divalent aliphatic hydrocarbon radicals represented by R$^1$ are selected from alkylene radicals and cycloalkylene radicals.

6. The resin of claim 2 wherein said divalent aliphatic ether residues represented by R$^1$ are represented by the general formula $$(-R^5-O)_n R^6-$$

wherein:
R$^5$ is selected from alkylene radicals and cycloalkylene radicals;
R$^6$ is selected from alkylene radicals and cycloalkylene radicals; and
n is a positive integer having a value of from 1 to about 10.

7. The resin of claim 2 wherein said divalent aromatic radicals represented by R$^1$ are represented by the general formula

wherein:
R$^7$ is independently selected from monovalent hydrocarbon radicals and halogen radicals;
Ar is selected from divalent aromatic radicals; and
q is a positive integer having a value from and including zero up to the number of replaceable hydrogen atoms present on Ar.

8. The resin of claim 7 wherein Ar is selected from phenylene, biphenylene and naphthylene radicals.

9. The resin of claim 7 wherein said monovalent hydrocarbon radicals represented by R$^7$ are selected from alkyl, cycloalkyl, aryl, aralkyl and alkaryl radicals.

10. The resin of claim 7 wherein Ar is selected from divalent aromatic radicals represented by the general formula

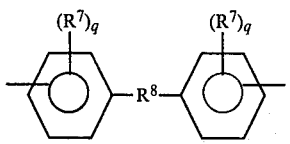

wherein $R^8$ is selected from alkylene radicals, alkylidene radicals, cycloalkylene radicals, cycloalkylidene radicals, —O—, —S—S—,

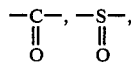

—S—, and

11. the resin of claim 1 wherein said divalent hydrocarbon radicals represented by W are selected from alkylene radicals, cycloalkylene radicals, alkylidene radicals, and cycloalkylidene radicals.

12. The resin of claim 1 wherein said monovalent hydrocarbon radicals represented by $R^9$ are selected from alkyl radicals, cycloalkyl radicals, aryl radicals, aralkyl radicals, and alkaryl radicals.

13. The resin of claim 1 wherein said halogen radicals are selected from chlorine and bromine radicals.

14. The resin of claim 1 wherein said residue is the residue of bisphenol-A.

15. The resin of claim 14 wherein R is the phenylene radical.

16. The resin of claim 15 wherein said carbonate precursor is phosgene.

17. The resin of claim 16 wherein $R^1$ is an alkylene radical.

18. The resin of claim 16 wherein $R^1$ is a cycloalkylene radical.

19. The resin of claim 16 wherein $R^1$ is a divalent aliphatic ether residue.

20. Thermoplastic aromatic copolyester-carbonate resin exhibiting improved processability containing the reaction products of:
 (i) at least one diester-diol which is the coreaction product of (a) at least two moles of at least one aromatic hydroxy carboxylic acid or an ester forming reactive derivative thereof, and (b) one mole of a diol selected from aliphatic diols, aliphatic ether diols, and aromatic diols;
 (ii) at least one dihydric phenol; and
 (iii) a carbonyl halide carbonate precursor.

21. The resin of claim 20 wherein said diester diol is utilized in a processability improving amount.

22. The resin of claim 21 wherein said processability improving amount is from about 1 to about 45 mole percent, based on the amount of said dihydric phenol present.

23. The resin of claim 22 wherein said processability improving amount is in the range of from about 2 to about 25 mole percent, based on the amount of said dihydric phenol.

24. The resin of claim 21 wherein said aromatic hydroxy carboxylic acid is represented by the general formula

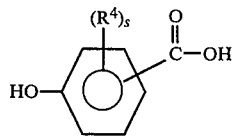

wherein:
 $R^4$ is independently selected from monovalent hydrocarbon radicals and halogen radicals; and
 s is a positive integer having a value of from 0 to 4 inclusive.

25. The resin of claim 24 wherein said monovalent hydrocarbon radicals represented by $R^4$ are selected from alkyl radicals and cycloalkyl radicals.

26. The resin of claim 24 wherein s is zero.

27. The resin of claim 21 wherein said ester forming reactive derivative of said aromatic hydroxy carboxylic acid is represented by the general formula

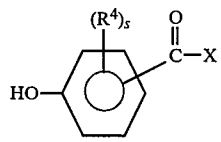

wherein:
 $R^4$ is independently selected from monovalent hydrocarbon radicals and halogen radicals;
 s is a positive integer having a value of from 0 to 4 inclusive; and
 X is selected from halogen radicals and —$OR^{12}$ radicals wherein $R^{12}$ represents a monovalent hydrocarbon radical.

28. The resin of claim 21 wherein said aliphatic diols are selected from alkylene diols and cycloalkylene diols.

29. The resin of claim 21 wherein said aliphatic ether diols are represented by the general formula

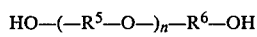

HO—(—$R^5$—O—)$_n$—$R^6$—OH wherein:
 $R^5$ is selected from alkylene and cycloalkylene radicals;
 $R^6$ is selected from alkylene and cycloalkylene radicals; and
 n is a positive integer having a value of from 1 to about 10.

30. The resin of claim 21 wherein said dihydric phenol is represented by the general formula

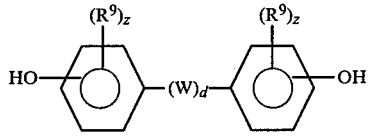

wherein:
 $R^9$ is independently selected from monovalent hydrocarbon radicals and halogen radicals;

W is selected from divalent hydrocarbon radicals, —O—, —S—, —S—S—,

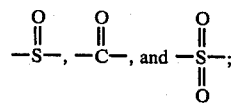

z is independently selected from positive integers having a value of from 0 to 4 inclusive; and d is either zero or one.

31. The resin of claim 30 wherein said divalent hydrocarbon radicals are selected from alkylene, cycloalkylene, alkylidene, and cycloalkylidene radicals.

32. The resin of claim 30 wherein said monovalent hydrocarbon radicals are selected from alkyl, cycloalkyl, aryl, aralkyl, and alkaryl radicals.

33. The resin of claim 30 wherein said dihydric phenol is bisphenol-A.

34. The resin of claim 33 wherein said carbonyl halide carbonate precursor is phosgene.

35. The resin of claim 34 wherein said aromatic hydroxy carboxylic acid or an ester forming reactive derivative thereof is hydroxy benzoic acid or an ester forming reactive derivative thereof.

36. The resin of claim 35 wherein said diol is selected from aliphatic diols and aliphatic ether diols.

* * * * *